United States Patent
Leta et al.

(10) Patent No.: US 7,837,879 B2
(45) Date of Patent: Nov. 23, 2010

(54) VISBREAKING YIELD ENHANCEMENT BY ULTRAFILTRATION

(75) Inventors: Daniel P. Leta, Flemington, NJ (US); Leo D. Brown, Baton Rouge, LA (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 134 days.

(21) Appl. No.: 12/230,818

(22) Filed: Sep. 5, 2008

(65) Prior Publication Data

US 2010/0059412 A1    Mar. 11, 2010

(51) Int. Cl.
*C10G 9/00*    (2006.01)
(52) U.S. Cl. .................. 210/650; 210/649; 210/651; 208/67; 208/86; 208/106
(58) Field of Classification Search ............ 208/67, 208/86, 106, 309; 210/649–651
See application file for complete search history.

(56) References Cited

U.S. PATENT DOCUMENTS

| | | | |
|---|---|---|---|
| 4,615,791 A * | 10/1986 | Choi et al. ................. | 208/107 |
| 4,797,200 A | 1/1989 | Osterhuber | |
| 5,256,297 A * | 10/1993 | Feimer et al. .............. | 210/651 |
| 5,430,224 A | 7/1995 | Schucker | |
| 5,785,860 A | 7/1998 | Smith | |
| 6,187,987 B1 | 2/2001 | Chin et al. | |
| 6,524,469 B1 | 2/2003 | Schucker | |
| 2003/0019790 A1 | 1/2003 | Schucker | |

OTHER PUBLICATIONS

Gary, J.H. et al. (2007). Petroleum Refining Technology and Economics, 5th ed., CRC Press, 465 pgs. (Office action cited p. 121).*
PCT International Search Report, Oct. 30, 2009.
PCT Written Opinion, Oct. 30, 2009.

* cited by examiner

*Primary Examiner*—Glenn A Caldarola
*Assistant Examiner*—Brian McCaig
(74) *Attorney, Agent, or Firm*—Glenn T. Barrett; Malcolm Keen

(57) ABSTRACT

Ultrafiltration may be effectively used to produce visbreaker feeds of improved quality which enable the visbreaker to be operated at higher severity with higher yields of distillable products. A heavy oil feed stream is separated by ultrafiltration or membrane separation into a permeate fraction and a retentate fraction by contacting the heavy oil feed with the first side of a porous membrane separation element in a membrane separation zone. The permeate fraction, comprised of materials which pass selectively through the porous membrane element, is retrieved and at least a portion of it is subjected to visbreaking with the improved liquid yield, especially of lighter distillate fractions. The retentate fraction can be retrieved from the first side of the porous membrane and can also be subjected to visbreaking.

8 Claims, 1 Drawing Sheet

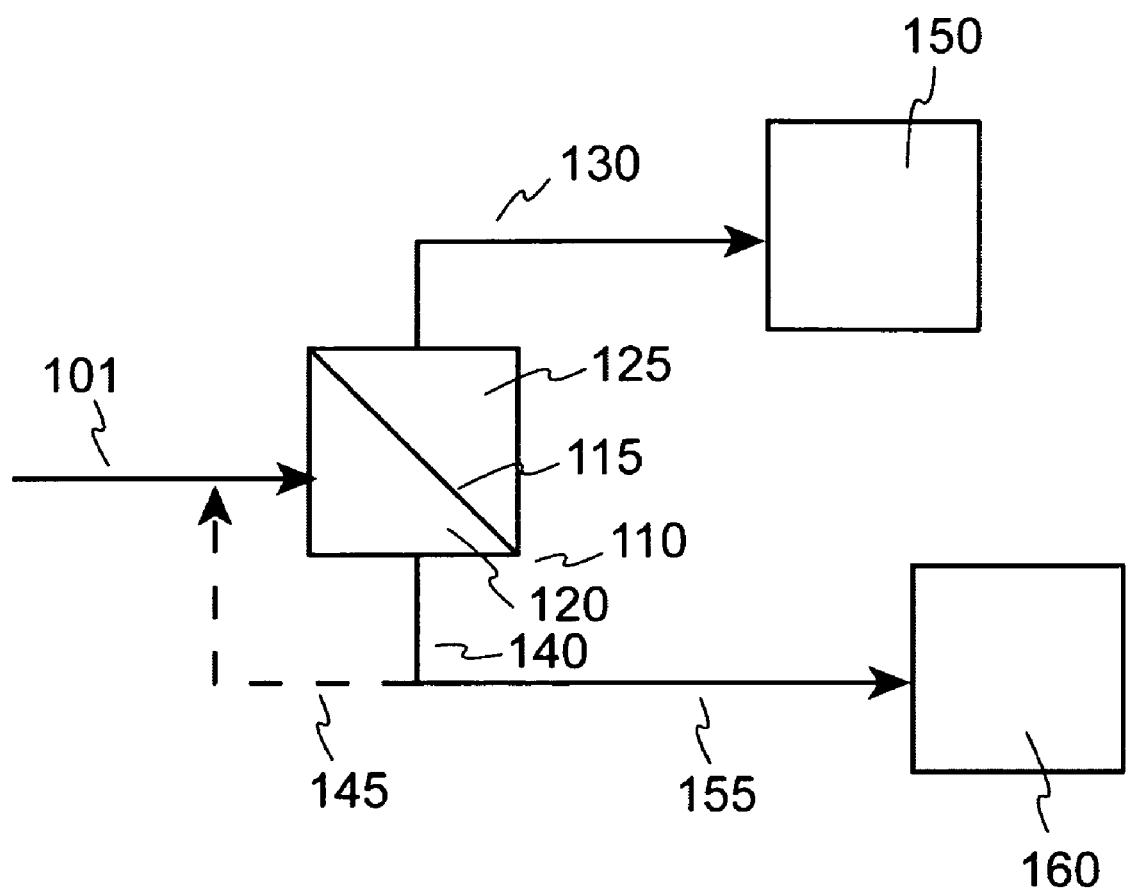

VISBREAKING YIELD ENHANCEMENT BY ULTRAFILTRATION

FIELD OF THE INVENTION

This invention relates to a method of improving visbreaker yields and conversions, especially of the conversion to distillate useful as road diesel fuel. The method utilizes an ultrafiltration process for upgrading heavy oil feeds such as vacuum resids into feed streams for the visbreaker.

BACKGROUND OF THE INVENTION

Visbreaking is a long established petroleum refining process for the mild conversion by thermal cracking of heavy oil feeds such as vacuum resid which was originally developed for reducing the pour points and viscosities of residual stocks used in the manufacture of fuel oil so as to reduce the amount of cutter stock required to dilute the resid to meet fuel product specifications. Visbreaking may also be used to increase feeds stocks for FCC use and gasoline yields.

The visbreaking process operates by thermally cracking viscous, high molecular weight hydrocarbons into lighter, less viscous products although conversion does not achieve high levels. The process is essentially, a mild thermal cracking without substantial coke production, although visbreakers do need to be periodically decoked to remove the coke deposits which progressively accumulate over long periods in normal operation. It is, however, the limitation on coke formation which marks out visbreaking as a mild, usually liquid-phase thermal cracking operation, distinct from higher severity thermal cracking processes such as delayed coking which result in a much larger proportion of the feed being converted to coke. For most feedstocks, the conversion to light products (gasoline and lighter) is normally limited to about 10 percent; up to some 20 percent will normally go to total light distillate (e.g. 370° C.–) fractions with the remainder in the gas oil range, e.g. the non-residual (distillable) 370° C.+ fraction. Because the resid feeds commonly used have greater coking tendencies than gas oils, lower temperatures are normally used in visbreaking than in thermal cracking; typically ranging from about 455 to 525° C. (850 to 975° F.) under pressures up to 7000 kPag (about 1000 psig), typically 350 to 2100 kPag (about 50 to 300 psig) but commonly in the range 350 to 700 kPag (50 to 100 psig).

Visbreaker units are generally of two types, soaker or coil. The soaker type unit uses a heater ahead of a heat soak drum which is a tank-like vessel fitted with internals to reduce back mixing and improve plug flow, in which the heated feed is held for a time sufficient to enable the desired degree of thermally-induced cracking to proceed. The coil visbreaker normally has a two-zone fired heater with the reaction zone formed by furnace coils through which the feed passes in plug flow. The soaker visbreaker operates at lower temperatures with longer residence times than the coil type visbreaker and, as a result, tends to have a lower energy requirement. The coil visbreaker, however, enables better control of the reaction conditions with varying feeds and can, moreover, be more easily decoked by steam-air decoking. In both cases, however, the cracking reactions are terminated by quenching and no resort is made to recycle. Typical furnace outlet temperatures for a coil unit would be 475 to 500° C. (about 885-930° F.) with a residence time in the coil of one to three minutes whereas a soaker unit would use a lower furnace outlet temperature of 425-450° C. (about 800-840° F.).

Visbreaker feeds generally comprise high molecular weight paraffins, aromatics, asphaltenes, as well as aromatics and asphaltenes with paraffinic side chains. These feedstreams are usually highly viscous with viscosities generally from about 20 to about 1500 centistokes at 100° C. (212° F.). Typical heavy hydrocarbon feedstreams to the visbreaking process are those that have an initial boiling point above 315° C. (about 600° F.), more preferably above about 425° C. (about 800° F.). Common visbreaker feeds may be comprised of crude atmospheric tower bottoms, crude vacuum tower gas oils and/or crude vacuum tower bottoms.

Preferably, a significant amount of products can be converted into the naphtha boiling range products with a typical boiling range of about 25° to 250° C. (about 80° F. to about 450° F.), and distillate to gas oil range products typically boiling in the range of 1750 to 425° C. (about 350° F. to about 800° F.). Due to the limited severity of visbreaker operation, the visbroked liquid product will include a large proportion in the heavy gas oil range (about 290° to about 425° C./about 550° to about 800° F.) as well as visbreaker bottoms which generally have boiling points above 400° C. (about 750° F.), more typically above about 425° C. (about 800° F.). Excessive severity with its greater conversion to lighter products can, however, lead to several problems in the visbreaking process. The first is an overabundance of light gases in the product. These light gas products are generally of low economic value and are therefore undesired. Secondly, high severities can result in excessive formation of coke in the visbreaking unit and fouling deposits, in the form of toluene insolubles, in the liquid product. Although facilities and operating conditions may minimize as well as remove some of the coke formation in the unit. As a result, visbreaker units must be taken out of service at periodic intervals in order to remove the coke that forms in the unit. For these reasons, it is desirable to run the visbreaker unit within controlled ranges of severity.

High visbreaker severity can result in the formation of highly aromatic product streams. These streams may be of limited value for use in commercial fuel products due to restrictions on aromatic fuel contents and may also cause the fuel products to be excessively unstable: the products may polymerize and develop waxes bringing the desired products out of required fuel specifications as well as causing plugging problems in associated equipment.

Heavy gas oil range products from the visbreaker containing significant amounts of aromatic hydrocarbons may be catalytically cracked further into lighter fuels such as naphthas or gasolines, but excessive coke formation on the cracking catalysts (e.g., a fluid catalytic cracking or hydrocracking catalyst) is a common consequence, resulting in decreased catalytic activity, as well as increased unwanted processing unit emissions (such as CO and $CO_2$ from FCC regenerators) or increased catalyst regeneration in hydroprocessing units.

Similarly, the visbreaker bottoms product stream may possesses similar undesirable properties arising from a high aromatic content. A significant amount of the aromatic content of the visbreaker bottoms product stream is in the form of asphaltenes with their characteristic high Conradson Carbon Residue (CCR) number. The high asphaltene content and high CCR number of the visbreaker bottoms stream render it prohibitive to process this stream further catalytically and for this reason, the visbreaker bottoms stream is usually thermally cracked in a resid conversion unit such as a coker unit or diluted as required for sale as fuel oils. Both the visbreaker gas oil product and the visbreaker bottoms product, however, contain significant amounts of valuable high molecular weight saturated hydrocarbons with relatively low CCR content although they cannot be removed from the undesired highly aromatic, high CCR hydrocarbons by conventional fractionation techniques.

There is therefore a need to improve visbreaker operation to enable the operational severity to be increased without increasing, at the same time, the formation of coke and other fouling products

SUMMARY OF THE INVENTION

We have now found that membrane separation or ultrafiltration as it is sometimes called, may be effectively used to produce visbreaker feeds of improved quality which enable the visbreaker to be operated at higher severity. The permeate stream from the ultrafiltration has been found to be particularly amenable to use as an improved visbreaker feed but, surprisingly, the retentate stream also has the potential to improve visbreaker operation at higher severity.

According to the present invention, a process for improving the liquid yield from a visbreaking operation, separates a heavy oil feed stream into a permeate fraction and a retentate fraction by contacting the heavy oil feed with the first side of a porous membrane separation element in a membrane separation zone. The retentate fraction which remains on the first side of the porous membrane element is comprised of materials which do not pass through the porous membrane element whereas the permeate fraction is comprised of materials which pass selectively through the porous membrane element from its first side to its second side from which the permeate product stream is retrieved and at least a portion of it is subjected to visbreaking with an improved liquid yield, especially of lighter distillate fractions when high severity conditions are used. The retentate fraction can be retrieved from the first side of the porous membrane and it too can be subjected to visbreaking.

DRAWINGS

In the accompanying drawings the single FIGURE is a simplified process schematic for providing a feed separated by ultrafiltration to a visbreaker.

DETAILED DESCRIPTION

According to the present invention, a heavy oil feed for visbreaking is subjected to ultrafiltration prior to a visbreaking step which may be operated at a higher severity than with the untreated feed. Generally, the ultrafiltration permeate fraction will be used as the visbreaker feed since it has an increased level of the more paraffinic components but the retentate may also be used, as described in more detail below.

Process Configuration

FIG. 1 is a simplified process schematic for the integration of the ultrafiltration and the visbreaker. A heavy hydrocarbon stream entering though line 101 contacts an ultrafiltration membrane 115 in a membrane separation unit 110 in which the membrane 115 has a retentate zone 120 on the feed side and a permeate zone 125 on the side remote from the feed/retentate side. A permeate product stream comprising components that selectively permeate through the membrane 115 is obtained on the second side of the membrane and leaves the ultrafiltration separator by way of line 130. The retentate product stream 140 is obtained from the feed side of the membrane and leaves the separator through line 140.

The permeate product stream or at least a potion of it is further processed in a visbreaker 150 designed to upgrade the permeate product stream into one or more final or intermediate products. A portion of the retentate product stream 140 obtained is sent by way of line 155 for further processing in a visbreaker 160 (which may be a different unit to visbreaker 150 or the same unit in blocked operation) to upgrade the retentate product stream into one or more final or intermediate fuel products. Alternatively, the retentate may be sent to another refinery unit such as a pyrolysis unit (thermal cracker) e.g. a fluid coker, a Flexicoker, or a delayed coker, or a catalytic unit such as a fluid catalytic cracker or a hydrocracker. Alternatively, the retentate may be sent to the refinery fuel oil blending pool.

A portion of the retentate product stream from line 140 may be recycled through line 145 and combined with the heavy hydrocarbon feed in line 101 either prior to contacting with membrane 115 in separation unit 110 within the retentate zone of separation unit 110.

Process Feeds

The feed to the ultrafiltration step is a heavy oil feed, typically a residual, i.e. non-distillable fraction although other heavy feeds, boiling above about 350° C. (660° F.) may also be processed by the present method, for example, whole or topped crudes, synthetic crudes and blends of crudes or crude blends, tar sand oils, heavy shale oils, bitumens. Normally, heavy oil fractions of this kind contain little or no material boiling below about 350° C. (about 660° F.) and in most cases, the 5% point will be at least 425° C. (about 800° F.) or higher, typically at least 480° C. (about 900° F.); the 10% point by HTSD is normally at least 480° C. (about 900° F.), for example, 565° C. (about 1050° F.) or even higher. The non-distillable (700° C.+/about 1300° F.+) residual fraction will normally be in excess of 50 weight percent of the feed and in some cases may make up over 80 weight percent or more of the feed. Residual streams conventionally contain components which will boil under normal vacuum distillation conditions and thus, some distillable components may be present even in resid-type feeds. Useful residual feeds include atmospheric resids but vacuum resids represent a preferred class of feed since the atmospheric resids contain components recoverable under vacuum distillation which are more economically used elsewhere in the overall refining scheme. Vacuum resid feeds may be blended with other feeds but preferably, at least 50 weight percent and more preferably at least 75 weight percent of the feed will be vac resid.

The boiling point distribution can be obtained by a physical distillation in a laboratory, but more convenient specialized gas chromatographic techniques have been developed for the petroleum industry. One such GC method is High-Temperature Simulated Distillation (HTSD), described by D. C. Villalanti, et al. In "High-Temperature Simulated Distillation Applications in Petroleum Characterization" in *Encyclopedia of Analytical Chemistry*, R. A. Meyers (Ed.), pp. 6726-6741 John Wiley, 2000; this method has been found to be effective for characterizing the boiling point distributions of vacuum residua. Boiling point distributions are reported as weight percent off versus atmospheric equivalent boiling point (AEBP).

Ultrafiltration

The ultrafiltration or membrane separation may be carried out using a variety of membrane materials, including molecular weight cutoff polymer membrane systems, surface-functionalized polymers, polymer membranes with inherent voids in their structure, polymer membranes containing entrained inorganics, carbon membranes, and numerous inorganic membrane systems, especially ceramic micopore membranes, porous metals e.g. titania on stainless steel, and porous glasses or combinations of these materials. Pervaporation membranes may also find application in this process. Typical polymer membrane materials which may be used when produced with the requisite porosity include polyimides, polycarbonates, poly(acrylonitrile-co-methacrylic acid) and expanded poly(tetrafluoroethylene). Particular polymers that may be useful in embodiments of the present invention are polymers comprised of polyimides, polyamides, and/or polytetrafluoroethylenes provided that the membrane material chosen is sufficiently stable at the operating temperature of the separations process. The class of inorganic membrane systems contains a multitude of compositions (e.g., alumina, silica, titania, zirconia, and many composites of these oxides, as well as zeolites) ranging from microfiltration capabilities to ultra- or nanofiltration systems. Depending upon the feed and the selected membrane, the degree of separation of the low metals/MCR permeate and the high metals/MCR retentate may be determined empirically in accordance with known parameters and correlations for such systems. A description of various polymeric perstraction membrane materials is found in U.S. Pat. No. 5,430,224 (Schucker) to which reference is made for such a description.

The permeability of the membrane will also need to be determined on an empirical basis since the molecular dimensions of the feed molecules will vary according to the composition of the feed to the separation step. In general, permeabilities in the order of 50 to 50,000 Gurley seconds (polymer, especially PTFE, membranes) are useful for most feeds with values of 1,000 to 10,000 Gurley seconds (e.g., approximately 5,000 Gurley seconds) being the normal order for useful membranes. Expressed alternatively in Dalton porosities, membranes having porosities of from about 2 to 500 kiloDaltons, in most cases from 5 to 300 kiloDaltons, preferably 5 to 50 kiloDaltons, will be suitable for many heavy oil feeds to achieve the separation desired for the present purposes. In terms of membrane pore size, the membrane material will normally have an average pore size of about 0.001 to about 2 microns ($\mu$m), more preferably about 0.002 to about 1 micron, and even more preferably about 0.004 to about 0.1 microns.

The membranes should be constructed of such materials and designed so as to withstand prolonged operation at elevated temperatures and transmembrane pressures. Membranes comprised of a ceramic, a metal, a glass, a polymer, or combinations of these materials are preferred from this point of view although, as noted above, polymeric membrane materials may be used it they are capable of withstanding the conditions of operation.

The use of higher pressures has been found to be favorable to the properties of the permeate in that the microcarbon residue precursors and metals contents (mainly, nickel and vanadium) are lower at high pressures. It is hypothesized that under pressure over a porous membrane material, the polar constituents of a heavy hydrocarbon liquid mixture tend to associate, forming a layer of aggregated polar material (over or at the membrane surface), which, in turn, serve to reject polars and other large molecules, but pass more linear and smaller molecules such as saturates. As the pressure increases, the efficacy of this layer appears to increase further restricting passage of polars with a net increase of efficiency (i.e., rejecting MCR precursors and metals with greater efficiency). When the feed pressure is removed, the layer tends to disassociate, returning to a homogenous mixture of heavy hydrocarbons. While batch operations are simpler, feed recycle can sometimes maintain higher fluxes in operation by reducing membrane fouling at the surface; selectivities can also potentially improve in this configuration by reducing local concentration gradients of the feed at the membrane surface during operation. Membrane performance can sometimes be improved during operation by removal of the membrane for cleaning, or through in situ performance regeneration procedures (e.g., backflushing).

Although not necessary to obtain the desired separation, it is preferable that the transmembrane pressure be above about 2500 kPag (abut 360 psig). Selective separation of certain components is enhanced at these higher transmembrane pressures from 2500 to 21,000 kPag (about 360 to about 3000 psig), for example, pressures in the range of 3500 to 17,000 kPag (about 505 to about 2460 psig) such as 4800 to 10,000 kPag (about 700 to about 1500 psig). Preferably the transmembrane pressure is at least 4800 kPag (about 700 psig), more preferably at least 7000 kPag (about 1000 psig), even more preferably at least 8300 kPag (about 1200 psig), and most preferably at least 10,000 kPag (about 1450 psig).

The ultrafiltration step is normally carried out at moderately elevated temperature in view of the high viscosity of the feed streams although operation at ambient temperature is not precluded. Temperatures of the heavy hydrocarbon feedstream when contacting the membrane element is usually at least 100° C. and normally in the range from about 1000 to about 350° C., preferably about 1000 to about 300° C. Temperatures above about 350° C. are not favored in order to minimize thermal cracking. For heavy hydrocarbon feedstreams containing a substantial portion of vacuum resids, the most preferable temperature is from 2000 to 300° C.

The membrane system can be engineered in several different feed configurations, such as 'batch' feed to the system, or crossflow feed, where the feed is recycled over the front side of the membrane. Likewise the membrane can be 'deadended' where the permeate collects on the backside of the barrier and is retrieved by gravity flow or, alternatively, a circulating permeate sweep can be utilized. This latter mode of operation can sometimes improve membrane performance by reducing a buildup of permeate on the backside membrane surface.

The membrane permeate obtained from the initial resid feed stream contains only low levels of MCR precursors and metals and can be sent to the visbreaker as a blend with conventional visbreaker feed. The retentate, containing most of the MCR precursors and metals can also be sent to visbreaking since its increased content of aromatics relative to paraffinics gives it greater solubilizing power for materials that would normally be precipitated out of solution upon visbreaking with normal feeds with their relatively greater paraffin content. In this way, the present invention achieves—apparently anomalously—a twofold improvement in the visbreaking process by enabling the visbreaking to be operated with the original feed once it has been separated into the two components by the ultrafiltration process: both the permeate and the retentate feeds can be used as visbreaker feeds under optimal visbreaking conditions for each feed although these will need to be established empirically for each of these feeds.

The Microcarbon Residue (MCR) is determined by test method ASTM D4530, Standard Test Method for Determination of Carbon Residue (Micro Method). Carbon residue may also be measured by ASTM D189-06 Standard Test Method for Conradson Carbon Residue of Petroleum Products (CCR).

The membrane separation may be expected to yield permeates with MCR levels of not more than 80% MCR level of the feed; reductions to 60% are feasible and to levels less than 50% in preferred cases. Depending on the proportion of the feed which actually passes through the membrane, the retentate will likely exhibit increases in its MCR values of at least 10 e.g. at least 20, or even 40 percent. Reductions in metals in the permeate stream will normally exceed 30 or 40 wt. pct. with lesser proportionate reductions in Total Acid Number (TAN) depending on the chemical composition of the resid feed. TAN is conventionally determined by ASTM Standard Test Method D664 but may also be measured by ASTM D974, D1534 or D3339.

The absolute viscosity (measured at 120° C./250° F.) of the permeate product stream may, in certain cases, be less than about 75%, e.g. less than 50%, of the absolute viscosity (120° C./250° F.) of the heavy hydrocarbon feedstream as a result of the removal of the more viscous aromatics and the resulting increase in the concentrations of lower viscosity paraffins.

Another factor affecting the separation in the ultrafiltration step and the quality and production rate of the permeate product is the Reynolds number of the process stream on the feed side of the membrane. The Reynolds number ($R_e$) in the retentate zone of the membrane module is preferably maintained at a value of at least about 2,000 or higher, for example, at least about 4,000, at least 6,000 or at least 8,000. The Reynolds numbers above can be an average Reynolds number of the overall modules in the membrane separations unit or the Reynolds numbers of any module or active portion of the overall membrane separation unit.

Visbreaker Operation

The permeate fraction from the ultrafiltration is sent to the visbreaker; the retentate fraction may also be used as visbreaker feed, as noted above, using either a separate visbreaker or the same visbreaker in blocked operation. The visbreaker may be operated according to an empirically determined evaluation of optimum processing conditions for the feed and the desired product. As shown in Examples 6 to 9, the use of the ultrafiltration step enables the visbreaking to be operated at higher severity than with the unseparated heavy oil feed while, at the same time, not having an increase in precipitated toluene insolubles. Most notable of all, however is the very significant increase in the volume of light product (370° C.−), useful with further processing into road diesel fuel or motor gasoline.

In general terms, visbreaker operating conditions will follow those outlined above, with temperatures and residence times varied for coil and soaker units, typically over a broad temperature range of about 455 to 525° C. (850 to 975° F.) with pressures up to 7000 kPag (about 1000 psig), typically 350 to 2100 kPag (about 50 to 300 psig) but frequently in the range 350 to 700 kPag (50 to 100 psig), depending if total liquid phase or liquid-vapor phase operation is used. The furnace outlet temperatures typical for a coil unit would be 475 to 500° C. (about 885-930° F.) with a residence time in the coil of one to three minutes whereas a soaker unit would typically use a lower furnace outlet temperature of 425-450° C. (about 800-840° F.) with a more extended residence time in the drum. The permeate can be subjected to visbreaking at a greater severity than the feed to the ultrafiltration step without increasing the extent to which carbon or toluene insolubles are generated. The visbreaker severity can in most cases be at least about 1.2 times as severe as the useful range of operating conditions applicable to the original heavy oil feed prior to ultrafiltration, at comparable coke make or comparable generation of hot filtration sediment (either reference basis may be used, as convenient, for purposes of severity comparison). Typically, the permeate stream can be visbroken at severities from 1.2 to 5, e.g. from 2 to 4, times those applicable to the original heavy oil feed at comparable coke make or hot filtration sediment generation. Visbreaker severity for the retentate may be higher than that applicable to the unseparated heavy oil feed (severity of at least 1.0 times) but in most cases will range from about 0.7 to 2.0, e.g. 0.9 to 1.2 times the severity applicable to the heavy oil feed to the overall process. As an overall, integrated measure, the visbreaker severity to which these factors would apply, can be stated in terms of equivalent reaction time. Equivalent reaction (usually expressed in seconds) is the calculated time at 468° C./875° F. that would have been equivalent to the actual run time temperature profile for a first order cracking reaction with an activation energy of 53 kcal/mol. Other visbreaking conditions will be largely conventional, including quenching, product recovery etc.

EXAMPLES

Examples 1 through 4 illustrate four separate ultrafiltration experiments run at differing test conditions using the pilot plant configuration described below.

In Examples 1 through 4 below, all of the experiments were run utilizing an ultrafiltration pilot plant and a commercial crude vacuum distillation resid product which was fed into the ultrafiltration unit by means of a feed pump with the fresh feed rate measured with a flow meter. A portion of the retentate stream was recycled to the feed line with the recycle flow rate measured via a flow meter prior to combining with the fresh feed. The combined feed/recycle stream was sent through a heat exchanger to maintain the stream at a desired temperature set point prior to introduction into the membrane separator. The pressure drop across the retentate zone and the transmembrane pressure were measured by means of pressure indicators. The permeate flow rate was measured by a flow meter and the permeate product and the remaining retentate product were collected.

The membrane separations unit as utilized in Examples 1, 2, and 3 was composed of two 40 inch (1.016 m) length tubular porous membrane modules placed in a series flow configuration in the ultrafiltration unit. Each membrane module had an approximate internal diameter of 0.72 inch (18 mm) and an approximate 25 inch (63.5 cm) porous length. The total porous area for the two modules was approximately 0.785 ft$^2$ (0.073 m$^2$). The membrane separations unit as utilized in Example 4 was composed of one tubular porous membrane with an approximate internal diameter of 0.72 inch (18 mm) and an approximate 60 inch (1.52 m) porous length. All membrane modules were made of sintered stainless steel metal with a titanium oxide ceramic layer.

The internal ceramic layer of the membrane modules for Examples 1, 2, and 3 had a nominal pore size of about 0.1 micrometers (μm) and the membrane modules had a membrane bubble point maximum pore size of about 1.84 μm. The internal ceramic layer of the membrane modules for Example 4 had a nominal pore size of about 0.02 micrometers (μm) and the membrane modules had a membrane bubble point maximum pore size of about 2.97 μm. The membrane bubble point maximum pore sizes of the membrane modules were measured in accordance with ASTM Method F316 "Standard Test Methods for Pore Size Characteristics of Membrane Filters by Bubble Point and Mean Flow Pore Test" utilizing methanol as a test fluid.

In all of the Examples, the transmembrane pressure was held at about 2760 kPa (400 psig), while flow rates, flow ratios, and temperatures, were varied to obtain a permeate yield of about 50 wt %. Permeate flux rates were measured during the testing, and analysis was performed on the Fresh Feed, and the Permeate and Retentate Products obtained for Micro Carbon Residue (MCR), nickel, iron, and vanadium contents. Viscosities of the Fresh Feed and final products from Examples 1 through 3 were also measured and presented in Table 3. Setpoints and process data points shown for Examples 1-4 are those achieved after the pilot plant achieved steady state operation.

Example 1

In this Example, the transmembrane pressure control setpoint was 2760 kPa (400 psi) (similar to Examples 2, 3, and 4). The combined feedstream temperature setpoint was 260° C. (similar to Examples 2 and 4). The fresh feed pump steady state flow rate was approximately 5.74 grams/min and the recycle pump steady state flow rate setpoint was approximately 15.235 grams/min. The ratio of the recycle flow rate to the fresh feed flow rate was approximately 2.654. This created a calculated crossflow velocity through the membrane modules of about 0.98 m/s (3.2 ft/s). The pilot plant unit was lined out to achieve a steady state operation to generate 50% permeate yield based on the fresh feed rate. After achieving steady state operation, a pair of permeate and retentate samples were collected for 17 hours and 50 minutes and analyzed.

Example 2

In this Example, the transmembrane pressure control setpoint was again 2760 kPa (400 psi). The combined feedstream temperature setpoint was also 260° C. The fresh feed pump steady state flow rate was approximately 15.96 grams/min and the recycle pump steady state flow rate setpoint was approximately 72.097 grams/min. The ratio of the recycle flow rate to the fresh feed flow rate was approximately 4.517. This created a calculated crossflow velocity through the membrane modules of about 4.6 m/s (15.0 ft/s). The pilot plant unit was lined out to achieve a steady state operation to generate 50% permeate yield based on the fresh feed rate. After achieving steady state operation, a pair of permeate and retentate samples were collected for 16 hours and 25 minutes and analyzed.

Example 3

In this Example, the transmembrane pressure control setpoint was again 2760 kPa (400 psi) but the combined feedstream temperature setpoint was raised to 290° C. The fresh feed pump steady state flow rate was approximately 31.44 grams/min and the recycle pump steady state flow rate setpoint was approximately 72.097 grams/min. The ratio of the recycle flow rate to the fresh feed flow rate was approximately 2.293. This created a calculated crossflow velocity through the membrane modules of about 4.6 m/s (15.0 ft/s). The pilot plant unit was lined out to achieve a steady state operation to generate 50% permeate yield based on the fresh feed rate. After achieving steady state operation, a pair of permeate and retentate samples were collected for 6 hours and 47 minutes and analyzed.

Example 4

In this Example, the transmembrane pressure control setpoint was again 2760 kPa (400 psi). The combined feedstream temperature setpoint was 260° C., as in Examples 1 and 2. The fresh feed pump steady state flow rate was approximately 20.00 grams/min and the recycle pump steady state flow rate setpoint was approximately 72.097 grams/min. The ratio of the recycle flow rate to the fresh feed flow rate was approximately 3.604. This created a calculated crossflow velocity through the membrane modules of about 4.5 m/s (14.8 ft/s). The pilot plant unit was lined out to achieve a steady state operation to generate 50% permeate yield based on the fresh feed rate. After achieving steady state operation, a pair of permeate and retentate samples were collected for 6 hours and 47 minutes and analyzed.

The process conditions, flux rates, and selectivity results from Example 1 to 4 are shown in Table 1, the analytical test results in Table 2 and the viscosities of the fresh feed, as well as of the permeates and retentates obtained from Examples 1 through 3, in Table 3.

As can be seen in Table 3, the absolute viscosities of the permeates are significantly reduced in comparison to the absolute viscosities of the heavy hydrocarbon feedstream.

TABLE 1

Process Conditions, Flux, and Selectivity Results

| Parameter | Example 1 | Example 2 | Example 3 | Example 4 |
|---|---|---|---|---|
| Temperature, ° C. | 259.7 | 260.2 | 290.4 | 260.4 |
| Transmembrane Pressure, kPa | 2780 | 2780 | 2790 | 2740 |
| Cross Flow Velocity (m/s) | 0.9 | 4.6 | 4.6 | 4.5 |
| Reynolds Number | 1417 | 6485 | 9807 | 6453 |
| Permeate Yield (based on wt % of fresh feed) | 49.2 | 50.3 | 50.0 | 50.0 |
| Permeate Flux (l./m2/day) | 63.6 | 177.2 | 352 | 183.7 |
| Membrane Bubble Point Maximum Pore Size (μm) | 1.84 | 1.84 | 1.84 | 2.97 |
| Nominal Pore Size, (μm) | 0.1 | 0.1 | 0.1 | 0.02 |
| MCR wt % Rejection | 28.0 | 28.0 | 24.4 | 24.4 |
| Nickel wt % Rejection | 45.2 | 44.8 | 46.4 | 47.3 |
| Vanadium wt % Rejection | 41.9 | 40.8 | 40.1 | 41.5 |

TABLE 2

Analytical Test Results

| Property | Fresh Feed | Example 1 Perm | Example 1 Ret | Example 2 Perm | Example 2 Ret | Example 3 Perm | Example 3 Ret | Example 4 Perm | Example 4 Ret |
|---|---|---|---|---|---|---|---|---|---|
| MCR, wt % | 16.4 | 11.8 | 19.8 | 11.8 | 20.0 | 12.4 | 20.3 | 12.4 | 19.9 |
| Rel Dens., 32° C. | 1.00 | 0.99 | 1.02 | 0.99 | 1.02 | 0.99 | 1.02 | 0.98 | 1.01 |
| API Gravity | 9.8 | 11.4 | 7.1 | 11.2 | 6.7 | 12.0 | 7.9 | 12.2 | 8.1 |
| Sulfur, wt % | 1.97 | 1.93 | 2.09 | 1.92 | 2.07 | 1.93 | 2.10 | 1.91 | 2.07 |
| Nickel, ppm | 39.7 | 21.8 | 55.0 | 21.9 | 58.1 | 21.3 | 55.6 | 20.9 | 56.0 |

TABLE 2-continued

Analytical Test Results

| Property | Fresh Feed | Example 1 Perm | Example 1 Ret | Example 2 Perm | Example 2 Ret | Example 3 Perm | Example 3 Ret | Example 4 Perm | Example 4 Ret |
|---|---|---|---|---|---|---|---|---|---|
| Iron, ppm | 11.5 | 8.3 | 23.4 | 2.3 | 32.7 | 1.6 | 32.9 | 1.5 | 23.4 |
| Vanadium, ppm | 112.7 | 65.5 | 151.9 | 66.7 | 157.9 | 67.6 | 150.4 | 65.9 | 152.7 |

TABLE 3

Analytical Test Results - Viscosities

| Temperature (°C./°F./) | Fresh Feed (Viscosity, cP) | Example 1 (Viscosity, cP) Permeate | Example 1 (Viscosity, cP) Retentate | Example 2 (Viscosity, cP) Permeate | Example 2 (Viscosity, cP) Retentate | Example 3 (Viscosity, cP) Permeate | Example 3 (Viscosity, cP) Retentate |
|---|---|---|---|---|---|---|---|
| 121° C./250° F. | 264 | 106 | 824 | 115 | 1082 | 118 | 886 |
| 149° C./300° F. | 81 | 38 | 201 | 41 | 251 | 42 | 215 |
| 177° C./350° F. | 33 | 19 | 71 | 18 | 84 | 18 | 76 |
| 204° C./400° F. | 16 | 10 | 32 | 10 | 37 | 10 | 34 |
| 232° C./450° F. | 9 | 6 | 17 | 6 | 19 | 6 | 18 |

The permeate flux rate is dependent upon the Reynolds number of the flow through the membrane. As can be from Table 1, Example 1, operated at a cross flow velocity of about 0.97 m/sec (3.2 ft/sec) and a Reynolds number of about 1,417 had a permeate flux of only about 63.5 l./m²/day. In Example 2, the transmembrane pressure and temperature were maintained as in Example 1 but the fresh feed rate and the retentate recycle rate were increased to obtain a crossflow velocity of about 4.6 m/sec with the result that the permeate flux increased significantly as compared to Example 1 to about 177 l./m²/day. The Reynolds number under these conditions was calculated to be about 6,485. This improvement in permeate flux was achieved with no significant detrimental impacts to CCR, nickel, or vanadium reductions.

The Reynolds number ($R_e$) through the membrane is determined by the formula for incompressible flow:

$$R_e = DV\rho/\mu \text{(dimensionless)}$$

where:

D = the internal diameter of the membrane tube

V = the average flow velocity of the fluid through the membrane tube (i.e., the retentate zone)

$\rho$ = the density of the fluid $\mu$ = the absolute viscosity of the fluid

In Example 3, the crossflow velocity was held at approximately the same rate as Example 2, at about 4.6 m/sec but the temperature was increased from about 260° C. to about 290° C. and its resulting impact on the fluid viscosity ($\mu$) was the main factor for the increase the calculated Reynolds number of about 9,807 in Example 3. As can be seen by comparing the data for and Example 3 in Table 1, the approximate 50% increase in the Reynolds number resulted in an approximate 100% increase in the permeate flux rate from Example 2 to Example 3. Here, the increase in Reynolds number was not a function of the crossflow velocities as the crossflow velocities of Examples 2 and 3 were essentially held the same.

The heavy hydrocarbon feed rate may be of sufficient volumetric rates to maintain the Reynolds number in the retentate zone(s) sufficiently high enough to maintain the desired permeate flux rates and/or separations selectivities. When a portion of the retentate product streams is recycled and combined with the fresh feedstream either prior to the heavy hydrocarbon entering a retentate zone of the membrane separations unit or in the retentate zone, sufficient cross-flow velocity can be maintained in the retentate zone of the separations unit even at low fresh feedstream rates. This retentate recycle configuration can also be economically attractive wherein low fresh feedstream rates are utilized in the process or wherein significant fluctuations in the feedstream rate may be experienced. When recycle of a portion of the retentate is used the ratio of retentate recycle flow rate to fresh feedstream flow rate (volumetric basis) is suitably greater than about 1, more preferably greater than about 10, and even more preferably greater than about 25.

It is believed that it is beneficial to maintain the operating conditions in the retentate zone of the membrane separations unit at a Reynolds number sufficient to maintain a thin retentate formed layer or coating onto the permeate side face of the membrane element(s) which, if too thick, can excessively restrict the flux of the permeate through the active membrane element. It is also believed herein that improvements in the flux and selectivity current process may be obtained by inducing vibrations into the membrane module and/or membrane separations system/housing to assist in the manipulation of this restrictive layering of the retentate stream. The vibrations may be induced into membrane module and/or membrane separations housing by mechanical or electromechanical means, such as, but not limited to, the use of a shaker apparatus or electromechanically induced vibratory amplifiers. Additionally, such vibrations may be induced directly into the feedstream conducted to or in the membrane unit, rather than the housing of the membrane unit itself.

In Example 4, a membrane module with a smaller average pore size than was used in Examples 1 through 3 was tested. In Example 4, the average pore size of the active membrane layer was about 0.02 micrometers ($\mu$m) as compared with an average pore size of the active membrane layer in Examples 1 through 3 of about 0.1 $\mu$m. The transmembrane pressure, temperature and crossflow velocities utilized in Example 4 were similar to those of Example 2. The results from the test conditions of Example 4 are shown in Table 1. Example 4 illustrates that small changes in the membrane module nominal pore size do not have a significant impact on the overall process performance. The permeate flux rate, as well as the CCR, nickel, and vanadium rejection rates obtained from Example 4 were similar to those obtained in Example 2 showing that small changes in the membrane module nominal pore size can be made in the pore size ranges without significant impacts on the overall performance of the process.

Example 5

Base Case

Visbreaking of Whole Vacuum Resid

A sample of Arab Light Vacuum Resid (ca. 565° C.+/1050° F.+) was visbroken in a pressurized autoclave to 150 equivalent reaction time (seconds). The visbroken product was determined to contain 2800 wt. ppm of toluene insoluble material (coke or coke precursors).

The boiling point distribution of feed and product (including light liquids collected in a knock-out pot) was:

|  | Feed | VB Product, 150 eq. sec. |
|---|---|---|
| 700° F.$^-$/370° C.−, wt. pct. | 0 | 14.8 |
| 1050° F.$^-$/565° C.−, wt. pct. | 18 | 45.5 |
| Toluene Insolubles (ppm) |  | 2800 |

Thus, in the base case, 14.8% of the feed is converted to products in the naphtha and diesel boiling range, i.e. <700° F./370° C. The 1050° F. contents indicate that 1050° F.$^+$/565° C.+ to 1050° F.$^-$/565° C.− conversion was 33.5%.

Example 6

Preparation of Permeate by Ultrafiltration of Arab Light Vacuum Resid

A vac resid permeate fraction was prepared by passing a portion of a sample of the Arab Light vac resid of Example 5 through a NGK ceramic multi-channel monolithic ultrafiltration filter of 50 kiloDalton (kD) porosity. The permeation was performed at temperatures between 220° C. and 240° C. using a transmembrane pressure of 3450 kPag/500 psig. Whereas the starting vacuum resid had a MCR content of about 23%, the collected composite permeate fraction was found to have a MCR content of 13.3%.

Examples 7-9

Visbreaking of Vacuum Resid Permeate

The vacuum resid permeate sample of Example 6 above was subjected to a series of three thermal visbreaking treatments similar to that described in the base case of Example 5 but at longer, more severe conditions of 180, 240, and 300 equivalent seconds. The boiling point distributions and toluene insoluble levels for the permeate feed and three products (products analyses include knock-out liquids) were:

|  |  | VB Product | | |
|---|---|---|---|---|
| Permeate Feed |  | 180 eq | 240 eq | 300 eq |
| 700° F.$^-$/370° C.− | 0.0 | 17.9 | 22.5 | 26.4 |
| 1050° F.$^-$/565° C.− | 21.0 | 54.0 | 58.2 | 61.0 |
| Toluene Insolubles (ppm) |  | 320 | 549 | 1014 |

Compared to the base case, the permeate feed was slightly enhanced in lighter components, having a 1050° F.$^-$/565° C.− content of 21% as compared to the 18% of the original vac resid. The permeate feed could be subjected to twice the severity (300 eq. sec. as compared to 150 eq. sec.) of the base case while generating only ⅓ the level of toluene insolubles (~1000 ppm compared to ~3000 ppm). At 300 eq. sec. it was possible to convert 26.4% of the original vac resid permeate feed into naphtha and diesel boiling range products (700° F.$^-$/370° C.−) and 34.6% into VGO (700-1050° F./370-565° C.). The 1050° F.$^-$/565° C.− contents indicate that for the 300 eq. sec. case, the 1050° F.$^+$/565° C.+ to 1050° F.$^-$/565° C.− conversion was 50.6%.

The higher visbreaking severities made possible by the ultrafiltration of the vac resid permeate compared to whole vac resid results in increased VGO and distillate (700° F.−/370° C.−) yields but the greatest relative increase and benefit arises from increased production of the most valuable 700° F.$^-$/370° C.) fractions, as shown below with the increase becoming more marked at the higher severities.

|  | VB Product | | |
|---|---|---|---|
| Permeate Feed | 180 eq | 240 eq | 300 eq |
| Δ 700° F.$^-$/370° C.−, wt. pct. | 17.9 | 22.5 | 26.4 |
| Δ 1050° F.$^-$/565° C.−, wt. pct. | 15.1 | 14.7 | 13.6 |

The invention claimed is:

1. A process for improving the distillable liquid yield from a visbreaking operation, comprising:

(i) contacting a heavy hydrocarbon feed stream having an initial boiling point of at least 350° C. and a 5% point above 425° C. and consisting of a vacuum resid or a vacuum resid with a portion of the retentate fraction from step (iii) with a first side of a porous membrane element of metal, ceramic or glass or a combination thereof having a porosity of 2 to 500 kiloDaltons in a membrane separation zone at a temperature of at least 200 to 350° C. and with a transmembrane pressure of at least 2500 kPa, to separate the heavy oil feed stream into retentate fraction which remains on the first side of the porous membrane element and a permeate fraction comprised of materials which pass selectively through the porous membrane element from the first side of the porous membrane element to a second side of the porous membrane element, (ii) retrieving the permeate product stream from the second side of the porous membrane element, (iii) retrieving a retentate fraction from the first side of the porous membrane element;

(iv) subjecting at least a portion of the retrieved permeate fraction to visbreaking, and (v) subjecting the retrieved retentate stream to visbreaking separately from the retrieved permeate fraction at a severity from 0.7 to 1.2 times as great as could be applied to the heavy hydrocarbon feed at comparable coke make or comparable hot filtration sediment generation.

2. A process according to claim 1 in which the ratio of the saturates content of the permeate product stream to the saturates content of the heavy hydrocarbon feed stream, by weight percent, is greater than 1.2.

3. A process according to claim 1 in which the visbreaking of the permeate is carried out at a severity at least 1.2 times as great as could be applied to the heavy oil feed at comparable coke make or comparable hot filtration sediment generation.

4. A process according to claim 1 in which the visbreaking of the retrieved retentate stream is carried out at a severity from 0.7 to 1.2 times as great as could be applied to the heavy oil feed at comparable coke make or comparable hot filtration sediment generation.

5. A process for improving the liquid yield from a visbreaking operation, comprising:

(i) feeding a heated heavy oil feed stream having an initial boiling point of at least 350° C. and a 5% point above 425° C. and consisting of a vacuum resid or a vacuum resid with a portion of the retentate fraction from step (iii) into an inlet of a membrane separation zone having a porous membrane element of metal, ceramic or glass or a combination thereof having a porosity of 2 to 500 kiloDaltons in which the feed stream is circulated under elevated pressure of at least 2500 kPa and at a temperature from 200 to 350° C. on a first side of a membrane separation element in the membrane separation zone from the inlet across to an outlet on the first side of the membrane separation element, to separate the heavy oil feed stream into a retentate fraction which remains on the first side of the porous membrane element and a permeate fraction comprised of materials which pass selectively through the porous membrane element from the first side of the porous membrane to a second side of the porous membrane element, (ii) retrieving the permeate product stream from the second side of the porous membrane element, (iii) retrieving a retentate fraction from the outlet on first side of the porous membrane element;

(iv) recycling a portion of the retentate stream retrieved from the outlet on the first side of the porous membrane element to the first side of the membrane separation element;

(v) subjecting at least a portion of the retrieved permeate fraction to visbreaking, and (vii) subjecting the portion of the retrieved retentate stream which is not recycled to the first side of the membrane separation element to visbreakinq separately from the retrieved permeate fraction at a severity from 0.7 to 1.2 times as great as could be applied to the heavy oil feed at comparable coke make or comparable hot filtration sediment generation.

6. A process according to claim 5 in which the ratio of the saturates content of the permeate product stream to the saturates content of the heavy hydrocarbon stream, by weight percent, is greater than 1.2.

7. A process according to claim 5 in which the visbreaking of the permeate is carried out at a severity at least 1.2 times as great as could be applied to the heavy oil feed at comparable coke make or comparable hot filtration sediment generation.

8. A process according to claim 5 in which the permeate is swept from the second side of the porous membrane element by means of a circulating stream of permeate.

\* \* \* \* \*